(No Model.)

C. G. DUFFY.
GAS PIPE HOLDER.

No. 312,193. Patented Feb. 10, 1885.

WITNESSES:
C. F. Horie
H. W. Love

INVENTOR.
Chas. G. Duffy
By Edwin H. Risley
Atty.

UNITED STATES PATENT OFFICE.

CHARLES G. DUFFY, OF UTICA, NEW YORK.

GAS-PIPE HOLDER.

SPECIFICATION forming part of Letters Patent No. 312,193, dated February 10, 1885.

Application filed January 10, 1884. (No model.)

*To all whom it may concern:*

Be it known that I, CHAS. G. DUFFY, of the city of Utica, in the county of Oneida and State of New York, have invented a new and useful Improvement in Gas-Pipe Holders; and I do hereby declare the following to be a full, clear, and exact description of the same, reference being had to the accompanying drawings, and to the letters and figures marked thereon.

My invention relates to that class of mechanism consisting of a device to securely hold in place gas-pipes to which chandeliers and gas-burners are to be attached, and adapted to hold the gas-pipe to which connections are made rigidly, so as to prevent the pipes from turning, thereby unscrewing the connection inside of the walls and ceilings in buildings; and it consists of a clasp constructed of malleable or gray iron, brass, or any other suitable metal or composition of metals, and is constructed with a flat surface adapted to fit the wall, and is of oblong shape. In the extreme ends are provided screw or bolt holes, to fasten the same securely to the wall or ceiling. In the center of the clasp is a circular hole adapted to fit closely around the pipe to be held, with an outward-projecting collar about half an inch in height, which may be varied in width according to the size of the pipe over which the same is to be used. The same may be adapted to hold rigidly iron water-pipes. Through the side of the collar is a screw-hole provided with screw-threads, in which a screw fits, adapted to be tightened or loosened by means of a screw-driver. The clasp is placed over the gas-pipe to be held and the flat surface crowded against the wall or ceiling. The same is screwed or bolted tightly to the wall or ceiling. The screw is then turned so as to hold the pipe rigidly in the collar.

Heretofore pipes adapted to receive gas-burners and chandeliers have been held by means of simple clasps provided with screw-threads on the inner side adapted to fit over the gas-pipes with corresponding screw-threads, and in some instances solder is then applied to make the connection rigid and to prevent the gas-pipe from turning when the burner or the chandelier is connected or disconnected.

By the use of my invention the process of securely holding the gas-pipe as described is very greatly cheapened, and the pipe is held more rigidly than it can be held by any processes now in use.

Having described the nature and construction of my invention, I will now proceed to describe it in reference to the accompanying drawings, in which similar letters refer to similar parts throughout.

Figure 1:
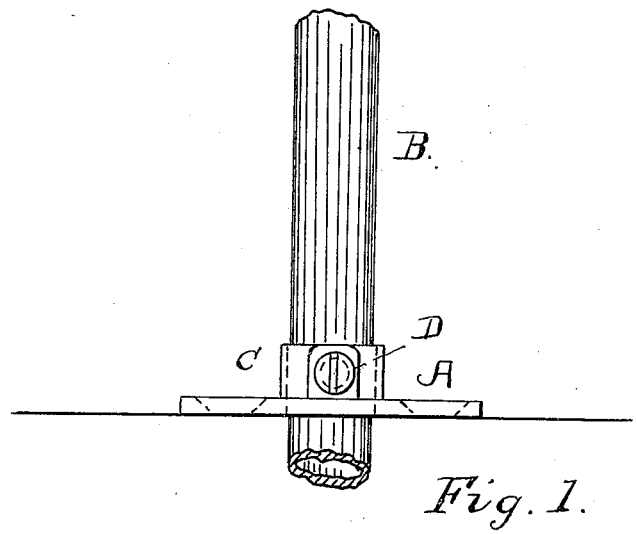
Figure 2:
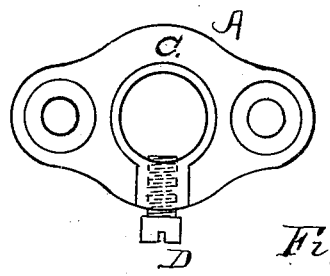
Figure 3:
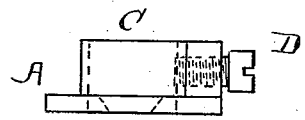

Figure 1 represents a side elevation of a gas-pipe with my improved clasp attached, held rigidly in place by means of the said screw. Fig. 2 represents a top view of my improved clasp. Fig. 3 represents a side view of the same.

In the accompanying drawings, A represents the surface of my improved clasp.

B represents a section of gas-pipe with my clasp attached.

C represents the upward-projecting collar, in which is a perforation with screw-threads adapted to receive the screw.

D represents a screw which is turned against the gas-pipe when the clasp is in place against the wall or ceiling, and is designed to hold the same rigidly.

What I claim as new, and desire to secure by Letters Patent, is—

A gas-pipe holder consisting of a plate having perforated wings, and a collar, C, provided with a set-screw, substantially as described.

CHAS. G. DUFFY.

Witnesses:
EDWIN H. RISLEY,
WILLIAM P. QUIN.